(12) United States Patent
Lee et al.

(10) Patent No.: US 8,938,601 B2
(45) Date of Patent: Jan. 20, 2015

(54) HYBRID MEMORY SYSTEM HAVING A VOLATILE MEMORY WITH CACHE AND METHOD OF MANAGING THE SAME

(75) Inventors: Dong Yang Lee, Yongin-si (KR); Jae Young Choi, Hwaseong-si (KR); Joo Young Hwang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 66 days.

(21) Appl. No.: 13/306,342

(22) Filed: Nov. 29, 2011

(65) Prior Publication Data
US 2012/0137055 A1 May 31, 2012

(30) Foreign Application Priority Data

Nov. 29, 2010 (KR) ........................ 10-2010-0120087

(51) Int. Cl.
G06F 12/00 (2006.01)
G06F 12/08 (2006.01)
G06F 12/02 (2006.01)
G06F 12/10 (2006.01)

(52) U.S. Cl.
CPC ............ *G06F 12/08* (2013.01); *G06F 12/0223* (2013.01); *G06F 12/1009* (2013.01); *G06F 2212/205* (2013.01); *G06F 2212/2024* (2013.01); *Y02B 60/1225* (2013.01)
USPC ............ 711/173; 711/129; 711/153; 711/170

(58) Field of Classification Search
USPC ........................................................ 711/170
See application file for complete search history.

(56) References Cited

U.S. PATENT DOCUMENTS

| 5,969,997 A | 10/1999 | Clinton et al. | |
|---|---|---|---|
| 2007/0156964 A1* | 7/2007 | Sistla | 711/133 |
| 2009/0106480 A1* | 4/2009 | Chung | 711/100 |
| 2009/0307430 A1* | 12/2009 | Bruening et al. | 711/119 |
| 2010/0037012 A1* | 2/2010 | Yano et al. | 711/103 |
| 2010/0077136 A1* | 3/2010 | Ware et al. | 711/103 |
| 2010/0082906 A1* | 4/2010 | Hinton et al. | 711/129 |
| 2010/0110748 A1 | 5/2010 | Best | |
| 2010/0191898 A1 | 7/2010 | Kim et al. | |
| 2010/0217966 A1 | 8/2010 | Shim | |
| 2010/0268927 A1* | 10/2010 | De Ven | 713/2 |
| 2011/0258364 A1* | 10/2011 | Leung | 711/103 |

FOREIGN PATENT DOCUMENTS

| KR | 10-2010-0086776 A | 8/2010 |
|---|---|---|
| KR | 10-2010-0095904 A | 9/2010 |

\* cited by examiner

*Primary Examiner* — Gurtej Bansal
(74) *Attorney, Agent, or Firm* — Lee & Morse, P.C.

(57) ABSTRACT

A hybrid memory system includes a central processing unit, a storage device configured to store user data and code data, and a main memory including a volatile memory and a nonvolatile memory, the main memory being configured to receive data necessary to perform an operation of the central processing unit from the storage device and to store the data, a part of the volatile memory being allocated for a cache for data stored in the nonvolatile memory.

15 Claims, 14 Drawing Sheets

| Page Type | PROPERTY | Page ALLOCATION AREA |
|---|---|---|
| Code | Read Only | PRAM |
| Stack | HIGH Read/Write FREQUENCY | DRAM |
| Heap | Read/Write OCCURS | DRAM or PRAM |
| Buffer for Library File | Read Only | PRAM |
| Buffer for Temporary File | Read/Write OCCURS | DRAM or PRAM |

FIG. 9

| Contents | | Initial Allocation | Migration Policy |
|---|---|---|---|
| Kernel | Code | PRAM | No migration |
| | Data | DRAM | No migration |
| User | Code | PRAM | No migration |
| | Stack | DRAM | No migration |
| | RO data | PRAM | No migration |
| | RW data | DRAM | Migrated to PRAM when required |
| | Heap | DRAM | Migrated to PRAM when required |

HYBRID MEMORY SYSTEM HAVING A VOLATILE MEMORY WITH CACHE AND METHOD OF MANAGING THE SAME

BACKGROUND

1. Field

Embodiments relate to a hybrid memory system and a method of managing the same.

2. Description of the Related Art

As for dynamic random access memory (DRAM) used as memory that is one of the essential elements in computers, various issues, such as the increase in power consumption (especially, standby power) with the increase in capacity, the increase of importance of backup to storage for prevention of loss of information stored in volatile DRAM, and doubts about the possibility of continuous DRAM bit growth in the long term, have been discussed in relation with memory and memory systems.

SUMMARY

An embodiment is directed to a hybrid memory system, including a central processing unit, a storage device configured to store user data and code data, and a main memory including a volatile memory and a nonvolatile memory, the main memory being configured to receive data necessary to perform an operation of the central processing unit from the storage device and to store the data, a part of the volatile memory being allocated for a cache for data stored in the nonvolatile memory.

Data having a read-only property may be stored in the nonvolatile memory and data having a read-write property may be stored in the volatile memory based on information of a page table.

The page table may include a plurality of entries each including a virtual address field, a physical address field corresponding to the virtual address field, a present field, and a property field, the present field may indicate whether data corresponding to a virtual address indicated by the virtual address field has been loaded to a memory area corresponding to a physical address indicated by the physical address field, and the property field may indicate a property of the data.

When it is requested to create a physical address corresponding to a virtual address to which the corresponding present field indicates an invalid status, the operating system may selectively load data from the storage device in a free frame of one of the volatile memory and the nonvolatile memory according to a type or a property of the data and update the page table with information about the frame.

Least recently used data among data stored in the cache of the volatile memory may be migrated to the nonvolatile memory.

The cache may include a file cache configured to store read-only file data, and an application data cache configured to store application data.

The volatile memory may be a dynamic random access memory, and the nonvolatile memory may be selected from the group of a phase-change random access memory, a flash memory, a magnetic random access memory, a ferroelectric random access memory, a resistive random access memory, a polymer random access memory, a nano floating gate memory, a holographic memory, a molecular electronics memory, and an insulator resistance change memory.

Another embodiment is directed to a method of managing a hybrid memory system that includes a volatile memory and a nonvolatile memory, the method including allocating a part of the volatile memory for a cache of the nonvolatile memory, loading data to one of the volatile memory and the nonvolatile memory when the data is needed to be loaded from a storage device to the hybrid memory system, and loading at least some of the data that is loaded to the nonvolatile memory to the cache in the volatile memory.

Loading may include selectively loading the data according to a property or a type of the data.

Loading may include selectively loading the data to one of the volatile memory and the nonvolatile memory according to the property of the data when data is needed to be loaded from a storage device to the hybrid memory system, and the property of the data may be one of a read-only property and a read-write property.

Loading may include selectively loading the data to one of the volatile memory and the nonvolatile memory according to the type of the data when data is needed to be loaded from a storage device to the hybrid memory system, and the type of the data may be selected from the group of code, stack, heap, buffer for a library file, and buffer for a temporary file.

The method may further include migrating at least some of the data from the cache to the nonvolatile memory when the cache is full.

The method may further include determining a property or type of at least some of the data in the volatile memory, and migrating at least some of the data to the nonvolatile memory based on the determined type or property.

The at least some of the data may be least recently used data among the data stored in the cache.

The cache may include a file cache configured to store read-only file data, and an application data cache configured to store application data.

Another embodiment is directed to a memory system, including a nonvolatile memory, a volatile memory, the volatile memory having allocated therein a designated cache portion, the cache portion being configured as a subset of the volatile memory and storing a copy of a part of data that is stored in the nonvolatile memory, and a memory manager, the memory manager being configured to write data from the cache portion of the volatile memory to the nonvolatile memory when the data is to be overwritten in the cache portion of the volatile memory.

The memory manager may also be configured to selectively allocate data to the volatile memory or the nonvolatile memory according to a data characteristic, the allocating of data to the nonvolatile memory including allocating the data to the cache portion of the volatile memory.

The selective allocation of data to the volatile memory or the nonvolatile memory may include evaluating the characteristic of the data to be allocated before writing the data to the selected memory, evaluating the characteristic of the data including determining whether the data is read-only data.

The memory manager may allocate the data to the nonvolatile memory if the data is read-only, the allocating of the read-only data to the nonvolatile memory including writing the read-only data to the nonvolatile memory or the cache portion of the volatile memory.

Evaluating the characteristic of the data may also include determining whether the data is non-read-only data, and the memory manager may allocate the data to the volatile memory if the data is non-read-only data, the allocating of the non-read-only data to the volatile memory including writing the non-read-only data to a portion of the volatile memory that is not used for the cache portion of the volatile memory.

BRIEF DESCRIPTION OF THE DRAWINGS

Features will become apparent to those of skill in the art by describing in detail example embodiments with reference to the attached drawings in which:

FIG. 9 illustrates a table showing the initial allocation and the migration policy with respect to data types according to an example embodiment;

DETAILED DESCRIPTION

Figure 1:
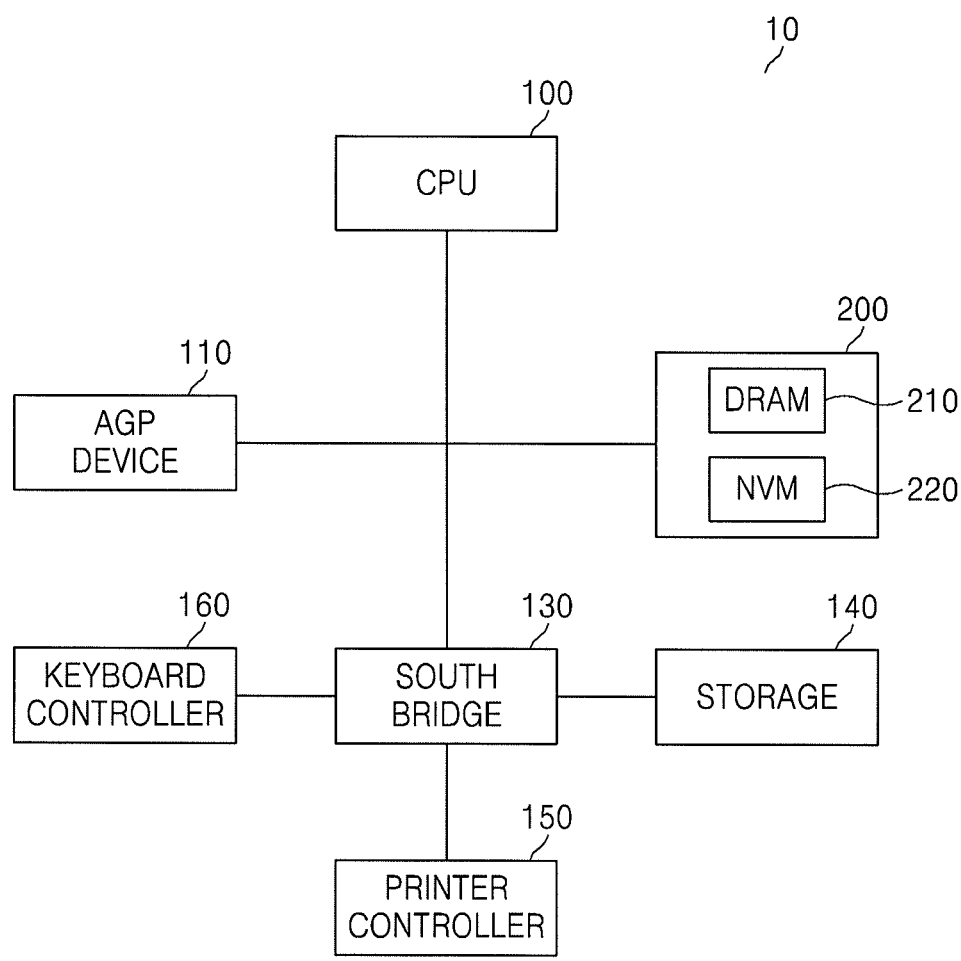
FIG. 1 illustrates a schematic block diagram of a hybrid memory system according to an example embodiment.

Korean Patent Application No. 10-2010-0120087, filed on Nov. 29, 2010, in the Korean Intellectual Property Office, and entitled: "Hybrid Memory System And Method Managing The Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc., may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 illustrates a schematic block diagram of a hybrid memory system according to an example embodiment. FIG. 1 shows an example of a computing system 10 using hybrid memory according to an example embodiment.

In the example embodiment shown in FIG. 1, the computing system 10 includes a central processing unit (CPU) 100, an accelerated graphics port (AGP) device 110, a main memory 200, a storage device (e.g., solid state drive (SSD) or hard disk drive (HDD)) 140, a south bridge 130, a keyboard controller 160, and a printer controller 150. The computing system 10 show in FIG. 1 may be a personal computer (PC) or a notebook computer. A hybrid memory system according to embodiments may be variously implemented, e.g., in a portable electric device such as a PMP, cellular phone, etc., a workstation or server, etc.

In the example embodiment shown in FIG. 1, the AGP device 110 and the main memory 200 are directly connected to the CPU 100, but they may be connected to the CPU 100 via a north bridge (not shown). Thus, the north bridge may be included in the CPU 100 in the present example embodiment. The storage device 140, the keyboard controller 160, the printer controller 150, and various peripheral devices (not shown) are connected to the south bridge 130. The AGP device 110 is a bus standard enabling fast realization of three-dimensional graphic representation. The AGP device 110 may include a video card used to play monitor images.

The CPU 100 may perform various operations needed to drive the computing system 10 and execute an operating system (OS) and application programs. The storage device 140 is a mass data storage that stores user data and code data. It may be an HDD, SSD, etc.

In the example embodiment shown in FIG. 1, the main memory 200 receives data necessary for the operation of the CPU 100 from the storage device 140 and loads and stores the data. The main memory 200 is a hybrid memory including a volatile memory 210 and a nonvolatile memory (NVM) 220. The volatile memory 210 may be a dynamic random access memory (DRAM) or another memory using a refresh operation to maintain data, and the NVM 220 may be memory that maintains data in the absence of power. The NVM 220 may be, e.g., a phase-change RAM (PRAM), flash memory, magnetic RAM (MRAM), ferroelectric RAM (FRAM), resistive RAM (RRAM), polymer RAM, nano floating gate memory, holographic memory, molecular electronics memory, insulator resistance change memory, etc.

In the present example embodiment, the storage device 140 is connected to the south bridge 130, but the storage device 140 may be connected to the north bridge, directly connected to the CPU 100, etc.

Figure 2:
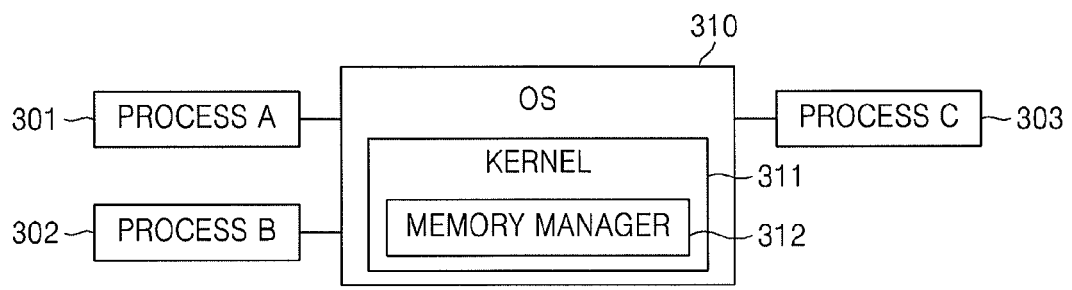
FIG. 2 illustrates a diagram showing the relationship between an operating system (OS) and processes according to an example embodiment.

FIG. 2 illustrates a diagram showing the relationship between an OS 310 and processes 301, 302, and 303 according to an example embodiment.

Referring to FIG. 2, the OS 310 functions as an interface between hardware of the computing system 10 and application programs, i.e., the processes 301 through 303, and manages the CPU 100, the main memory 200, and so on. The OS 310 includes a kernel 311, which includes a memory manager 312. The memory manager 312 manages the hybrid main memory 200.

Figure 3:
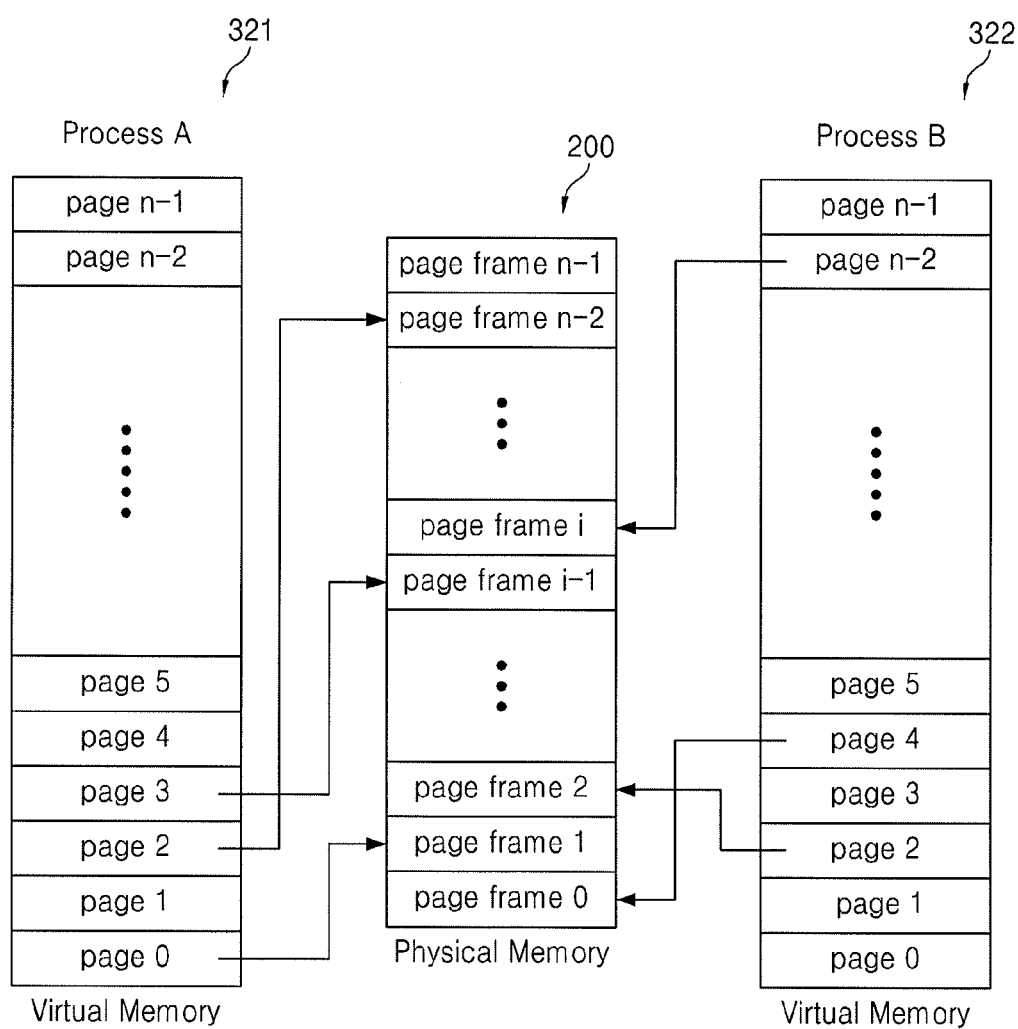
FIG. 3 illustrates a diagram showing the relationship between virtual memory and physical memory according to an example embodiment.

FIG. 3 illustrates a diagram showing the relationship between virtual memory and physical memory according to an example embodiment. In the example embodiment shown in FIG. 3, memory management is carried out separately for virtual memory and physical memory in a computer.

A virtual memory system allows a plurality of processes to share a single physical memory space with one another, thereby acting as if a system has more memory capacity than its physical memory capacity. Thus, the virtual memory system is an important feature that allows a program bigger than a given physical memory capacity to be executed in the system, and allows a plurality of programs or processes to be efficiently executed. For instance, even when the memory capacity of a given system is 1 gigabyte, virtual memory space may be $2^{32}$ bits=4 gigabytes for a 32-bit OS and $2^{64}$ bits=16 exabytes for a 64-bit OS, so that programs up to the 32-bit/64-bit capacity can be executed in the 1 gigabyte memory.

Each of the processes executed in a system has an independent virtual address space. This virtual address space is separated for each process, so that a process does not influence, and is not influenced by, other processes.

In order to execute a process, the process is temporarily stored in a physical memory at a proper time. Accordingly, memory management enables a process using a virtual address to be disposed at an appropriate physical address, and enables a physical address corresponding to the virtual address to be recognized. Such memory management is carried out by the memory manager 312 in the OS 310. The OS 310 positions a page in a virtual memory to a physical memory.

In the present example embodiment, the physical memory corresponds to the main memory 200 illustrated in FIG. 1. In the present example embodiment, the OS 310 recognizes the volatile memory 210 and the NVM 220 included in the main memory 200 together as a single physical memory. Accordingly, the physical memory includes the volatile memory 210 and the NVM 220, and either the volatile memory 210 or the NVM 220 is selected to store data according to the type or the property of the data.

A page is a unit by which a virtual memory is managed. A frame is a unit by which a physical memory is managed. The size of a page is the same as that of a frame. In a multi-process environment, a plurality of processes reside together in memory. Therefore, the number of pages is much more than the number of frames; all pages do not reside in a physical memory at a time. Accordingly, among all pages in the virtual memory, only pages necessary for the current operation are loaded to the physical memory.

In the embodiment illustrated in FIG. 3, two processes A and B in respective virtual memories 321 and 322 share the single physical memory 200, and virtual memory pages used for the current operation are made to reside in physical memory frames. As illustrated in FIG. 3, not all pages are loaded at a time, and each page can be loaded to any one of frames in the physical memory 200.

Although virtual memory addresses appear to have continuity, a page can be loaded by a page allocator in any one of the frames in the physical memory 200 regardless of physical addresses. Accordingly, a page table is used to recognize which page is loaded to which frame. The page table records a virtual address of a page, the position of a frame in which the page resides, i.e., a physical address into which the virtual address is translated by a memory management unit (MMU) of the CPU 100, and information about the page and the frame.

Figure 4:
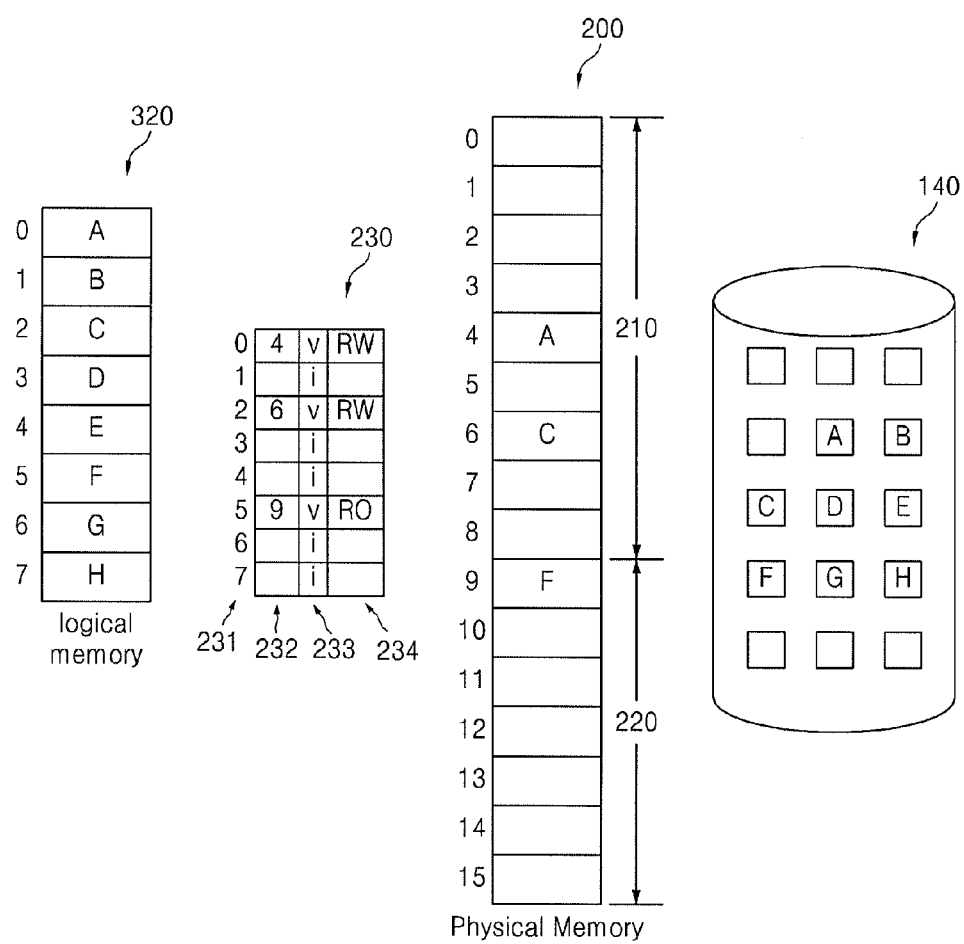
FIG. 4 illustrates a diagram showing a page table according to an example embodiment.

FIG. 4 illustrates a diagram showing a page table 230 according to an example embodiment. The page table 230 includes a plurality of entries (for example, as many as the number of pages). In the present example embodiment, each entry includes a virtual address field 231, a physical address field 232, a present field 233, and a property field 234.

In the example embodiment shown in FIG. 4, a page having a virtual address in a process is mapped to a frame in a physical memory area using a single page table. Each of the entries in the page table 230 corresponds to a single page. Pages 0, 2, and 5 in a virtual memory (i.e., a logical memory 320) are respectively loaded to frames 4, 6, and 9 in the physical memory 200, and entries in the page table 230 include this information.

"Valid" or "invalid" is expressed in the present field 233 to indicate whether a virtual page is loaded to a frame. In the present example embodiment, when a virtual page is loaded to a frame, "1" representing "valid" is recorded in the present field 233; otherwise, "0" representing "invalid" is recorded in the present field 233. When a program is executed, the MMU in the CPU 100 generates a physical memory address using a virtual memory address. At this time, when it is requested to generate a physical memory address corresponding to a virtual memory address of an invalid page having a value of "0", an invalid status is recognized based on a present bit of "0", which is referred to as page fault.

When the page fault occurs, the CPU 100 generates an exception interrupt, then holds an instruction for a program counter, and then carries out a subsequent instruction unrelated to the current instruction, or, when there is no other instruction, stands by until a necessary page is loaded to the physical memory 200 and used.

Figure 5:
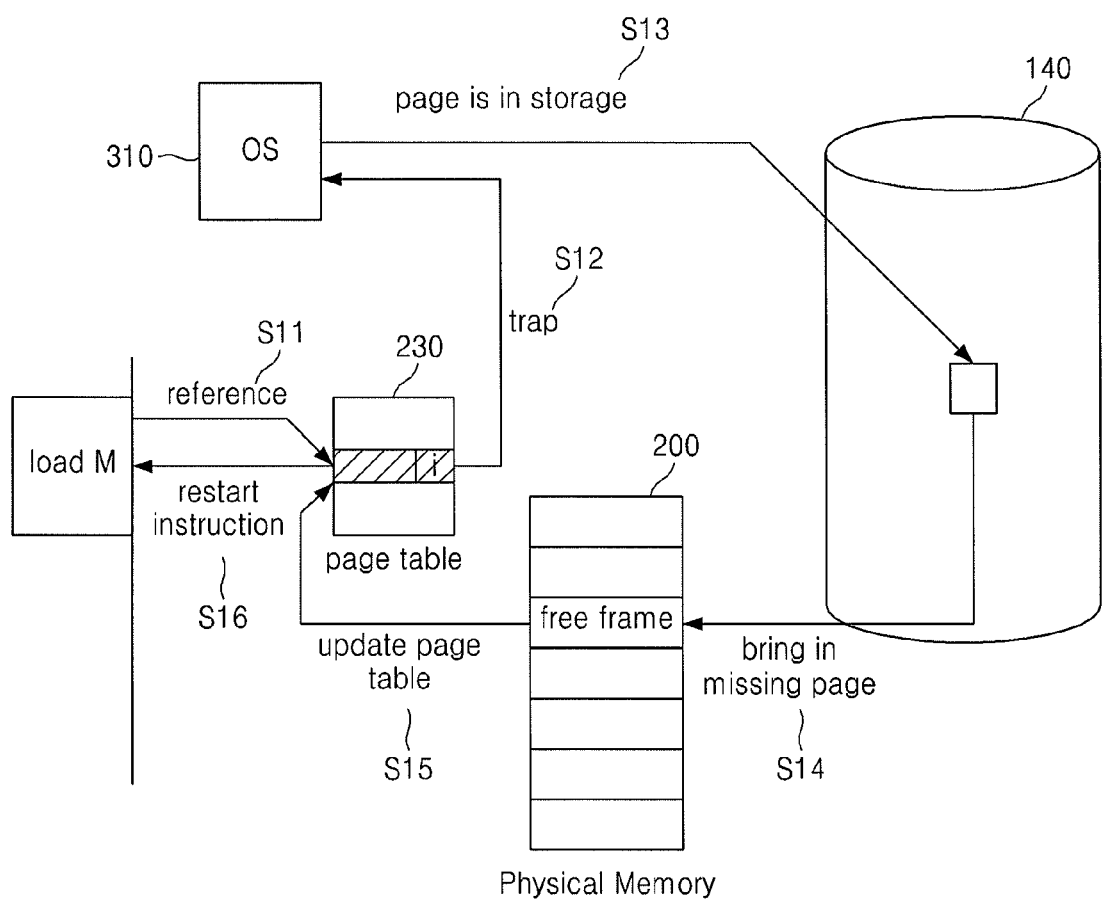
FIG. 5 illustrates a diagram for explaining an operation performed at a time of page fault according to an example embodiment.

FIG. 5 illustrates a diagram for explaining an operation performed at a time of page fault according to an example embodiment.

In the example embodiment shown in FIG. 5, when page fault occurs in operation S11, an exception handler in the OS 310 is called in operation S12. A page in the storage device 140 is loaded to a free frame in the physical memory 200 in operations S13 and S14. The page table 230 is updated with information about the frame in operation S15. When the page in the storage device 140 is loaded to the free frame in the physical memory 200, the page is allocated a free frame in an NVM area or a volatile memory area of the physical memory 200 according to the type of the page (e.g., data type or property). The page type is determined based on the property field 234 (see FIG. 4). For instance, the property field 234 may indicate whether the page or data has a read-only (RO) property or a read-write (RW) property. When the data has the RO property, the page may be loaded to the NVM area. When the data has the RW property, the page may be loaded to the volatile memory area.

After the entry in the page table 230 is updated, a bit of the present field 233 in an entry corresponding to the page is changed into "1" to make the page valid and the exception handler is terminated in operation S15. Thereafter, an instruction held in the CPU 100 is carried out based on the address information in operation S16.

Figure 6A:
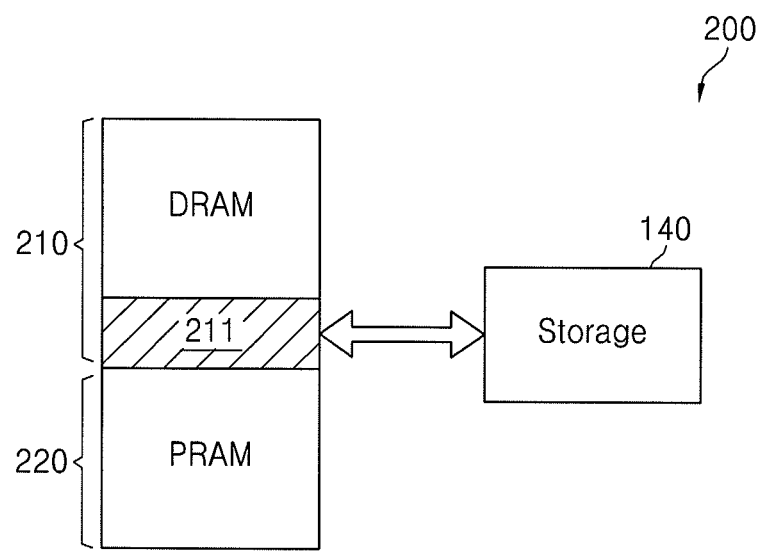
FIGS. 6A and 6B illustrate diagrams showing the disposition of programs and data in memory according to an example embodiment.
Figures 6B, 7:
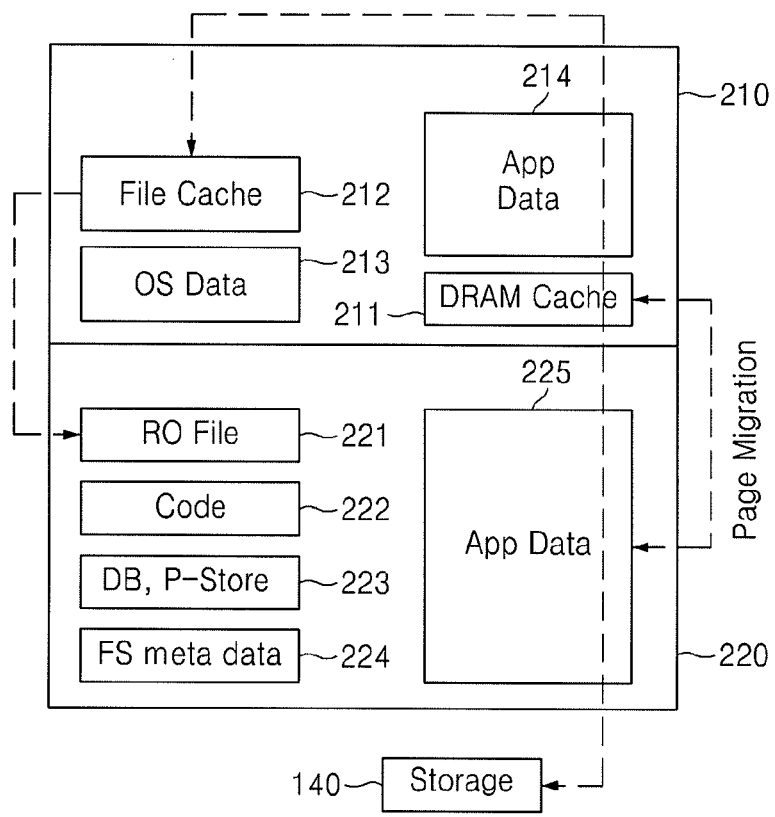
FIG. 7 illustrates a table showing the page allocation with respect to page types according to an example embodiment.

FIGS. 6A and 6B illustrate diagrams showing the disposition of programs and data in memory according to an example embodiment.

In a system including a hybrid memory including a volatile memory (e.g., DRAM) and a NVM (e.g., PRAM), content to be loaded to either the volatile memory or the NVM should be effectively managed in order to utilize the advantages of the volatile memory and the NVM, in contrast to a memory including only DRAM. When a virtual address is translated into a physical address, the page table is referred to. At this time, a typical OS loads a new program or data in a memory using an empty page regardless of the position of the page in the memory. However, according to embodiments, a memory manager in the OS may select the volatile memory or the NVM to store content (i.e., data) to be stored in a main memory according to the type or property of the data.

In the example embodiment shown in FIG. 6A, the main memory 200 is divided into the volatile memory (e.g., DRAM) 210 and the NVM (e.g., PRAM) 220, and a part of the volatile memory 210 is allocated for a cache area 211 of the NVM 220.

FIG. 6B illustrates another memory diagram according to an example embodiment. Assuming, for the sake of the present description, a relatively slow write speed of PRAM 220, OS-related data 213 (such as a stack, a heap, and a read/write file on which write events often occur) may be allocated to the DRAM 210. The PRAM 220 may be allocated for a code 222 of the OS or an application, an RO file data 221, a data base or P-store data 223, file system (FS) metadata 224, and application data 225. Some parts of the DRAM 210 may be allocated for caches 211 (DRAM) and 212 (file). The DRAM cache 211 may be used for caching the application data 225 and the file cache 212 may be used for caching the RO file data 221. Some application data 214 may be allocated to the DRAM 210.

FIG. 7 illustrates a table showing the page allocation with respect to page types according to an example embodiment. When receiving a request to allocate memory for execution of a program, the memory manager 312 of the OS 310 may selectively decide an initial memory area to be allocated for a page according to the type and/or property of the page, as illustrated in FIG. 7.

Referring to FIG. 7, a page type may be divided into a code, a stack, a heap, a buffer for a library file, and a buffer for a temporarily file. In the present example embodiment, for a program code page, access frequency is low and most of the access to the page is read access, such that loading the program code page to PRAM is not a significant problem. However, a stack page may have a high instantaneous access frequency and many write events such that, if the stack page is stored in PRAM, many processes or blocking may occur, decreasing the entire memory performance. Accordingly, in the present example embodiment, when page fault exception occurs during memory page allocation, the type of a memory page having fault is identified based on virtual address information about the memory page, and either the NVM 220 (e.g., PRAM) or the volatile memory 210 (e.g., DRAM) is selected as a physical allocation area for the memory page.

In a computer using virtual memory, an MMU of a process creates a physical address. When the process passes the virtual address to the MMU, the MMU translates the virtual address to the physical address. At this time, the MMU refers to translation look-aside buffer (TLB) for translation from the virtual address to the physical address. When TLB miss occurs, the MMU obtains translation information using a page table.

When memory space is not sufficient due to a change in a working set accompanying the execution of a program, swapping occurs between DRAM and a storage device in a typical system. As a result, the performance decreases when the capacity of memory, i.e., DRAM is not sufficient. However, in a hybrid memory system according to an example embodiment, both DRAM and PRAM are recognized as memory space, thereby bringing an effect of increasing a total memory capacity.

In practice, a memory area is not continuously used but has a tendency to localize. Accordingly, in an example embodiment, relatively frequently used content is allocated to a DRAM area; otherwise content is allocated to a PRAM area. Thus, memory capacity may be increased without decreasing performance. In addition, the write characteristic of a program may be an important factor for using a system without having endurance problems when using PRAM with a shorter endurance cycle than DRAM.

Figure 8:
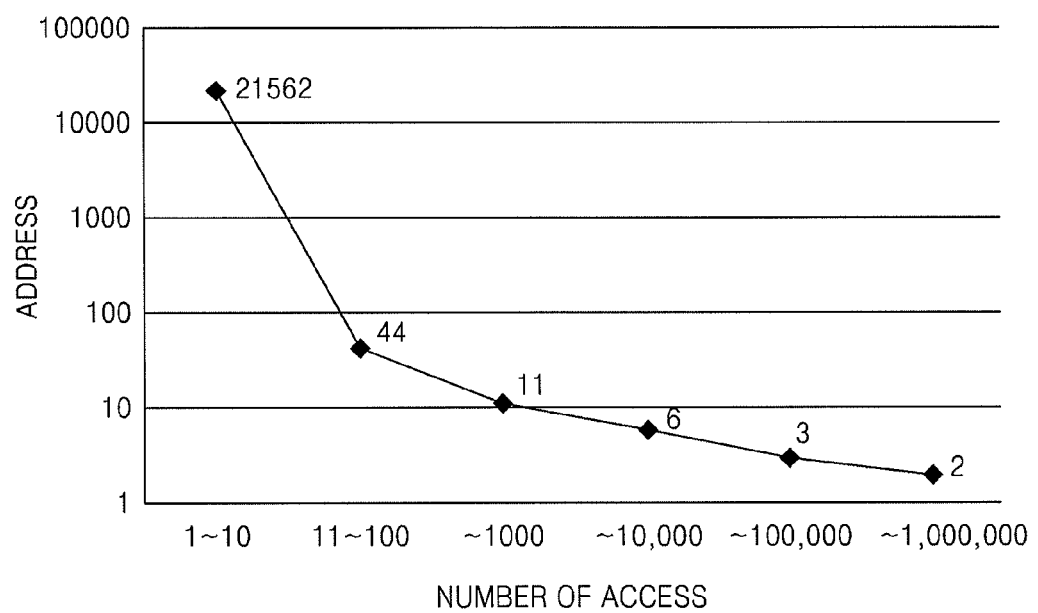
FIG. 8 illustrates a graph showing a result of measuring write characteristics of memory in a typical personal computer (PC)

FIG. 8 illustrates a graph showing a result of measuring the write characteristic of memory in a typical PC. Referring to FIG. 8, memory writing occurs intensively at particular addresses. When a program was repeatedly executed without the computer being rebooted, the addresses that were intensively accessed did not change. However, when the computer was rebooted, there was a change in the addresses that were intensively accessed.

According to an example embodiment, a part of DRAM is allocated for a cache for application data stored in PRAM, taking into account that writing may be concentrated on particular addresses in a typical PC. In an example embodiment, a least recently used (LRU) page replacement policy may be used in the cache. Thus, an area allocated for a cache in DRAM may be used as a cache for application data stored in PRAM. When this cache is full, LRU data may be migrated from the cache to the PRAM.

FIG. 9 illustrates a table showing the initial allocation and the migration policy with respect to data types according to an example embodiment. Application data may be stored in a PRAM area, and a part of DRAM may be allocated for a cache, to prevent performance deterioration and overcome an endurance problem. Thus, page migration may be used when the DRAM cache is full.

In the present example embodiment, when a page file is generated, a file property is recorded in a page table entry (PTE), as described above. In an example embodiment, the initial allocation of memory is carried out as illustrated in FIG. 9 based on property information in PTE's and page migration is performed according to the LRU page replacement policy. In another implementation, when data from the storage device 140 is initially loaded to the main memory 200 and PTE property information has yet to be generated or identified, the data from the storage device 140 may be stored in a predetermined memory area (e.g., a DRAM area). Thereafter, when the PTE property information is generated or identified, a memory area in which the data is to be stored is selected based on the property information.

Under this condition, replacement of a page residing in the DRAM cache may be carried out as follows. When the DRAM cache is not sufficient due to the working set of a progressing process, "out-of-cache" is reported to a memory allocator. Thereafter, a victim page is selected in the DRAM cache. The victim page is a page that will be swapped out and may be determined according to the LRU page replacement policy.

Next, a linked list is cancelled with reference to the PTE of the victim page. Next, a PRAM allocator called by the memory allocator selects a page area in PRAM. Thereafter, the victim page selected in the DRAM cache is copied to the selected page area in the PRAM. Next, the PET of the victim page copied to the PRAM is reset to change the page mapping in the page table.

In a hybrid memory system according to an example embodiment, the proportions of DRAM capacity and PRAM capacity may be changed in various ways. For instance, DRAM and PRAM may be in the same proportion (50:50). In another implementation, the proportion of the PRAM capacity may be higher than that of the DRAM.

Figure 10A:
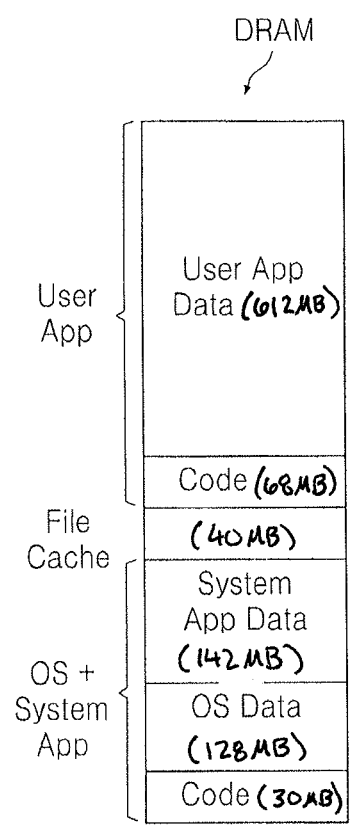
FIG. 10A illustrates a diagram showing an example of the structure of a typical main memory.
Figure 10B:
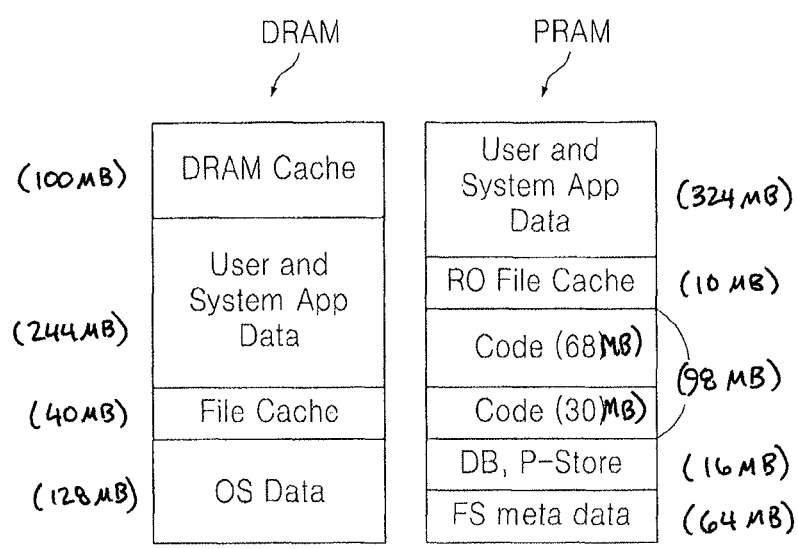
FIGS. 10B and 10C illustrate diagrams showing examples of the structure of a hybrid memory according to an example embodiment.
Figure 10C:
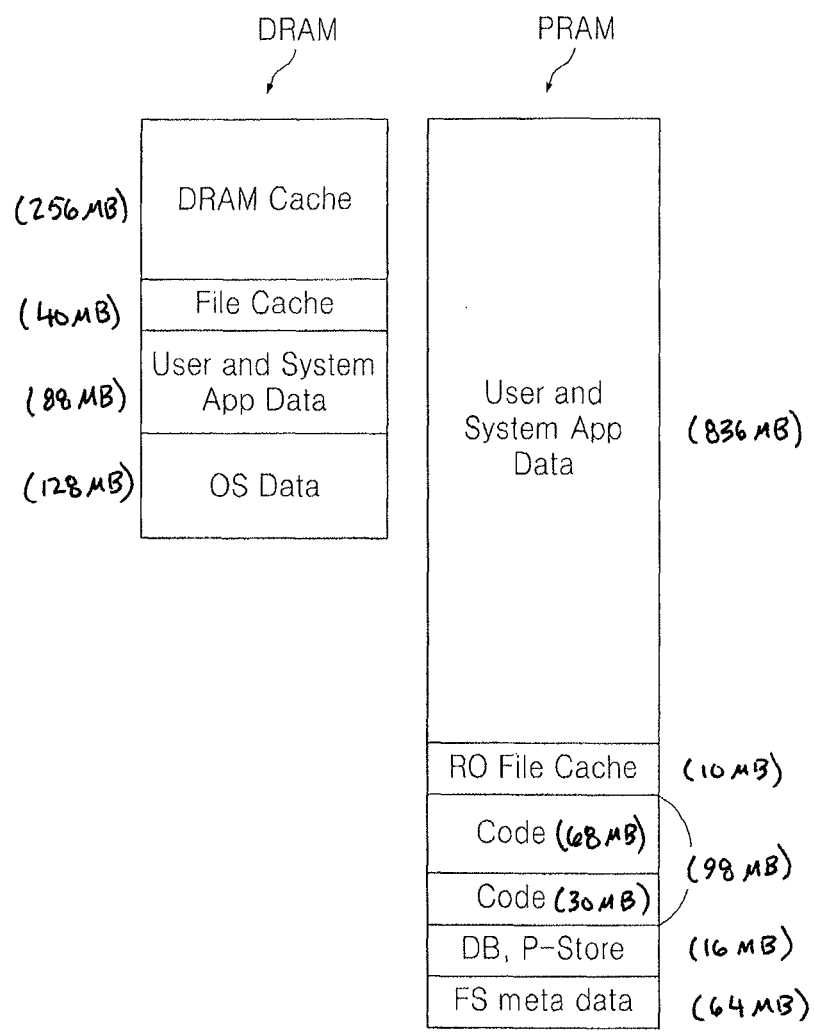

FIG. 10A illustrates a diagram showing a structure of a typical main memory. FIGS. 10B and 10C illustrate diagrams showing structures of hybrid memories according to example embodiments. Parenthetical numbers in FIGS. 10A, 10B, and 10C indicate example capacities. For example, (612) may mean 612 MB.

FIG. 10A shows a case where the typical main memory has only DRAM.

In the example embodiment shown in FIG. 10B, the sum of the capacities of both DRAM and PRAM is the same as the capacity of the DRAM-only memory shown in FIG. 10A. When the sum of the capacities of both DRAM and PRAM is the same, e.g., when both PRAM and DRAM are used with the same total memory capacity as the DRAM-only memory, swapping to a storage device may occur frequently.

In the example embodiment shown in FIG. 10C, the PRAM capacity is increased. The increase in PRAM capacity may reduce the swapping frequency so that space for storing application data is maximized. Thus, the swapping frequency may be decreased and the capacity of a DRAM cache may be sufficiently secured, and problems of power consumption and endurance of the PRAM may be avoided without performance deterioration.

Figure 11:
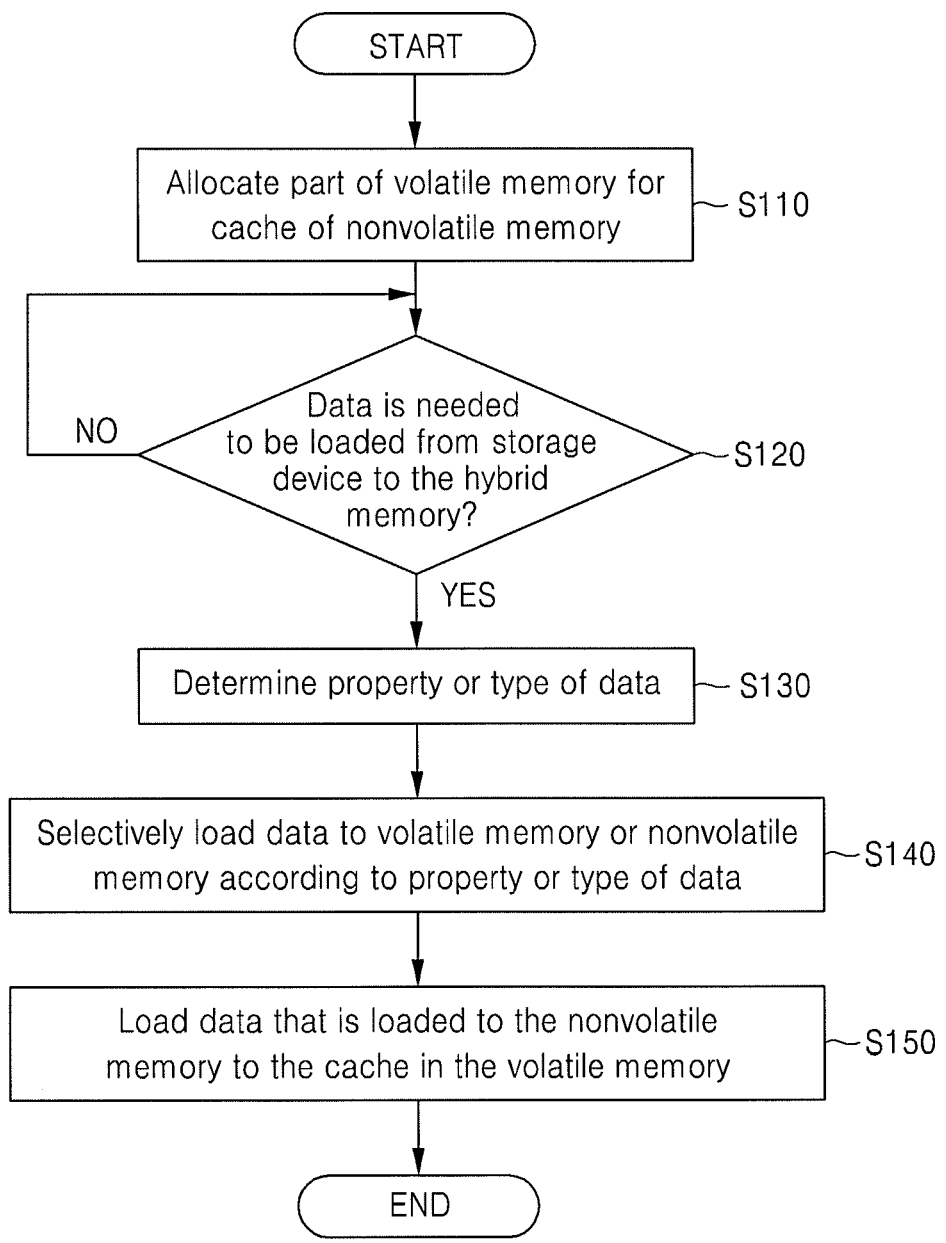
FIG. 11 illustrates a flowchart of a method of managing a hybrid memory system according to an example embodiment.

FIG. 11 illustrates a flowchart of a method of managing a hybrid memory system according to an example embodiment. Referring to FIG. 11, a part of the volatile memory is allocated for a cache of the nonvolatile memory in operation S110. Next, it is determined whether data is needed to be loaded from a storage device to the hybrid memory system in operation S120. If data is needed to be loaded from the storage device to the hybrid memory, the hybrid memory system determines a property or a type of the data in operation S130, and then selectively loads the data to one of the volatile memory and the nonvolatile memory according to the property or the type of the data in operation S140.

Also, the hybrid memory system loads the data that is loaded to the nonvolatile memory to the cache in the volatile memory in operation S150. The operations of S140 and S150 may be performed in parallel.

Figure 12:
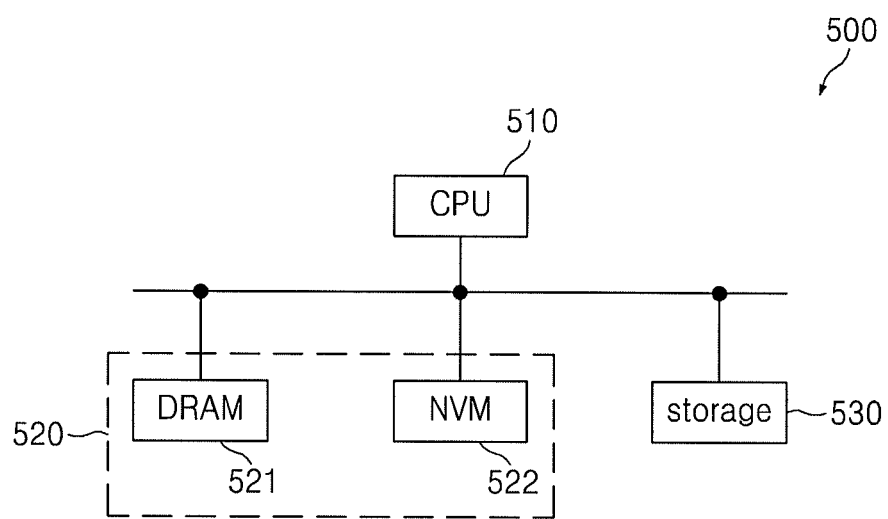
FIG. 12 illustrates a block diagram of a hybrid memory system according to other example embodiments.

FIG. 12 illustrates a block diagram of a hybrid memory system 500 according to another example embodiment.

In the example embodiment shown in FIG. 12, the hybrid memory system 500 includes a CPU 510, a main memory 520, and a storage device 530. The main memory 520 may be a hybrid memory including a volatile memory 521 (e.g., DRAM) and an NVM 522 (e.g., PRAM), like the main memory 200 shown in FIG. 1.

The storage device 530 stores data, such as OS's, diverse programs, and various types of data, in a nonvolatile manner. It may be an HDD, an SSD, etc.

Although not shown in FIG. 12, the hybrid memory system 500 may also include an input/output (I/O) module, for interface with users, and a power supply unit.

In an example embodiment, a hybrid memory system may be implemented in a PC, a notebook computer, a personal digital assistant (PDA), a cellular telephone, an MP3 player, a portable multimedia player (PMP), an automotive navigation system, a mobile Internet device (MID), etc.

By way of summation and review, approaches for using nonvolatile memory as a substitute for DRAM and approaches for using hybrid memory combining DRAM and nonvolatile memory are being researched and developed. Phase-change random access memory (PRAM) has advantages such as random access, nonvolatility, and performance coming between DRAM and NAND flash memory, but has disadvantages such as longer read/write latency longer and lower energy efficiency than DRAM, and a limited write endurance cycle. Accordingly, a simple substitution of DRAM by PRAM may not provide the desired characteristics for a memory system. In order to substitute DRAM with a PRAM nonvolatile memory, there are two issues: endurance lower than DRAM; and low write performance. At present, these issues may prevent substituting PRAM for DRAM in practice.

In a hybrid memory using DRAM and PRAM together, DRAM and PRAM should be separately managed to accommodate the endurance limits of PRAM and while enjoying the benefits of the nonvolatility of PRAM. For the separate management, a page swapper for the separate use of PRAM and DRAM may be used to allocate pages to PRAM or DRAM according to the frequency of write operations. However, in such a method, a memory area of PRAM is managed by pages; the number of write operations is counted for each page; the counted number is stored and retained in PRAM until a system is discarded, and a physical address of a page with high frequency of write operations is mapped to a DRAM area using this information. As a result, disadvantages of PRAM are compensated by minimizing the endurance limitations of PRAM and tailoring the use of DRAM. However, increasing performance and decreasing power consumption may still present challenges.

As described above, embodiments may provide a memory device, and more particularly, a hybrid memory system including nonvolatile memory and volatile memory, and a method of managing the same. An example embodiment provides a hybrid memory system configured to increase memory capacity while minimizing an increase of power consumption caused by the increase of memory capacity by using nonvolatile memory as a supplement to volatile memory, and a method of managing the same.

As described above, according to an example embodiment, when volatile memory space is insufficient due to a working set accompanying the execution of a program, page migration from volatile memory to NVM is carried out with respect to application data whose process is completed, thereby reducing storage access events when the program is executed again. In addition, a part of the volatile memory is allocated for a cache that stores application data to accomplish fast operation, thereby preventing performance deterioration occurring at the time of page migration to the NVM.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A hybrid memory system, comprising:
a central processing unit;
a storage device configured to store user data and code data; and
a main memory including a volatile memory and a nonvolatile memory, the main memory being configured to receive data necessary to perform an operation of the central processing unit from the storage device and to store the data, the volatile memory including a cache portion for data stored in the nonvolatile memory and a non-cache portion, wherein
when data of the storage device is initially loaded to the main memory, data having a read-only property is stored in the nonvolatile memory and is not stored in the volatile memory, data having a read-write property is stored in the volatile memory and is not stored in the nonvolatile memory according to information of an initial allocation, wherein
when data of the storage device is additionally loaded to the main memory by a request of the central processing unit, data having a read-only property is selectively stored in the nonvolatile memory and data having a read-write property is selectively stored in the volatile memory based on information of a page table, and wherein
least recently used data among data stored in the cache portion of the volatile memory is migrated to the nonvolatile memory.

2. The hybrid memory system as claimed in claim 1, wherein the cache portion includes:
a file cache configured to store read-only file data; and
an application data cache configured to store application data.

3. The hybrid memory system as claimed in claim 1, wherein the volatile memory is a dynamic random access memory, and the nonvolatile memory is selected from the group of a phase-change random access memory, a flash memory, a magnetic random access memory, a ferroelectric random access memory, a resistive random access memory, a polymer random access memory, a nano floating gate memory, a holographic memory, a molecular electronics memory, and an insulator resistance change memory.

4. The hybrid memory system as claimed in claim 1, wherein information of the initial allocation is based on a write characteristic of the main memory according to data types when the hybrid memory system is booted.

5. The hybrid memory system as claimed in claim 1, wherein:
the page table includes a plurality of entries each including a virtual address field, a physical address field corresponding to the virtual address field, a present field, and a property field,
the present field indicates whether data corresponding to a virtual address indicated by the virtual address field has been loaded to a memory area corresponding to a physical address indicated by the physical address field, and
the property field indicates a property of the data.

6. The hybrid memory system as claimed in claim 5, wherein, when it is requested to create a physical address corresponding to a virtual address to which the corresponding present field indicates an invalid status, the operating system selectively loads data from the storage device in a free frame of one of the volatile memory and the nonvolatile memory according to a type or a property of the data and updates the page table with information about the frame.

7. A method of managing a hybrid memory system that includes a volatile memory and a nonvolatile memory, the method comprising:
allocating a cache part in the volatile memory for data stored in the nonvolatile memory and a non-cache part in the volatile memory;
initially loading data of a storage device, wherein initially loading includes data having a first property to the nonvolatile memory and not to the volatile memory and loading data having a second property to the volatile memory and not to the nonvolatile memory according to information of an initial allocation based on data types;
additionally loading data of the storage device to one of the volatile memory and the nonvolatile memory when the data is needed to be additionally loaded from a storage device to the hybrid memory system; and
loading at least some of the data that is loaded to the nonvolatile memory to the cache part in the volatile memory, and
migrating at least some of the data from the cache part to the nonvolatile memory when the cache is full, the at least some of the data being least recently used data among the data stored in the cache.

8. The method as claimed in claim 7, wherein:
additionally loading includes selectively loading the data to one of the volatile memory and the nonvolatile memory according to the property of the data when data is needed to be additionally loaded from a storage device to the hybrid memory system, and
the property of the data is one of a read-only property and a read-write property.

9. The method as claimed in claim 7, wherein:
selectively additionally loading includes selectively loading the data to one of the volatile memory and the nonvolatile memory according to the type of the data when data is needed to be loaded from a storage device to the hybrid memory system, and
the type of the data is selected from the group of code, stack, heap, buffer for a library file, and buffer for a temporary file.

10. The method as claimed in claim 7, further comprising determining a property or type of at least some of the data in the volatile memory, and migrating at least some of the data to the nonvolatile memory based on the determined type or property.

11. The method as claimed in claim 7, wherein the cache part in the volatile memory includes:
a file cache configured to store read-only file data; and
an application data cache configured to store application data.

12. A memory system, comprising:
a nonvolatile memory;
a volatile memory, the volatile memory having allocated therein a designated cache portion and a non-cache portion, the cache portion being configured as a subset of the volatile memory and storing a copy of a part of data that is stored in the nonvolatile memory; and a memory manager, the memory manager being configured to write data from the cache portion of the volatile memory to the nonvolatile memory when the data is to be overwritten in the cache portion of the volatile memory, at least some of the data written from the cache portion of the volatile memory to the nonvolatile memory being least recently used data among the data stored in the cache portion of the volatile memory, wherein the memory manager is configured to initially allocate data having a first property to the volatile memory and not to the nonvolatile memory and initially allocate data having a second property to the nonvolatile memory and not to the volatile memory according to information of an initial allocation, the allocating of data to the nonvolatile memory including allocating the data to the cache portion of the volatile memory, and wherein the memory manager is configured to selectively allocate data to the volatile memory or the nonvolatile memory according to a data characteristic by a request of a central processing unit.

13. The memory system as claimed in claim 12, wherein the selective allocation of data to the volatile memory or the nonvolatile memory includes evaluating the characteristic of the data to be allocated before writing the data to the selected memory, evaluating the characteristic of the data including determining whether the data is read-only data.

14. The memory system as claimed in claim 13, wherein the memory manager allocates the data to the nonvolatile memory if the data is read-only, the allocating of the read-only data to the nonvolatile memory including writing the read-only data to the nonvolatile memory or the cache portion of the volatile memory.

15. The memory system as claimed in claim 13, wherein:
evaluating the characteristic of the data includes determining whether the data is non-read-only data, and
the memory manager allocates the data to the volatile memory if the data is non-read-only data, the allocating of the non-read-only data to the volatile memory including writing the non-read-only data to a portion of the volatile memory that is not used for the cache portion of the volatile memory.

* * * * *